(12) United States Patent
Li et al.

(10) Patent No.: US 6,738,758 B1
(45) Date of Patent: May 18, 2004

(54) ADAPTIVE BUCKET INDEXING MECHANISM TO EFFECTIVELY MANAGE SERVICE ACTIVATION REQUESTS

(75) Inventors: Yu-Hsien Li, Cupertino, CA (US); Sai V. Ramamoorthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/449,142

(22) Filed: Nov. 24, 1999

(51) Int. Cl.[7] .............................................. G06F 17/30
(52) U.S. Cl. ............................ 707/3; 379/201; 379/12; 707/7
(58) Field of Search .................. 379/114.02, 201.12, 379/201.02, 9, 201, 207.3; 370/352, 351, 270; 345/810; 707/10, 3, 7; 725/146; 717/7

(56) References Cited

U.S. PATENT DOCUMENTS

| | | | | | |
|---|---|---|---|---|---|
| 5,195,092 A | * | 3/1993 | Wilson et al. | ............... | 725/146 |
| 5,528,677 A | * | 6/1996 | Butler et al. | ............... | 379/196 |
| 5,548,761 A | * | 8/1996 | Balasundaram et al. | ........ | 717/7 |
| 5,687,224 A | * | 11/1997 | Alley et al. | ............. | 379/201.12 |
| 5,835,087 A | * | 11/1998 | Herz et al. | ................... | 345/810 |
| 5,872,779 A | * | 2/1999 | Vaudreuil | ................... | 370/352 |
| 5,881,131 A | * | 3/1999 | Farris et al. | ................. | 370/259 |
| 5,883,946 A | * | 3/1999 | Beck et al. | ............ | 379/201.12 |
| 5,920,846 A | * | 7/1999 | Storch et al. | ............ | 379/15.03 |
| 5,953,389 A | * | 9/1999 | Pruett et al. | .............. | 379/15.02 |
| 6,005,926 A | * | 12/1999 | Mashinsky | ............. | 379/114.02 |
| 6,029,195 A | * | 2/2000 | Herz | ............................ | 707/10 |
| 6,167,050 A | * | 12/2000 | Chung | ..................... | 370/235.1 |
| 6,226,365 B1 | * | 5/2001 | Mashinsky | ............. | 379/114.02 |
| 6,249,578 B1 | * | 6/2001 | Gilles et al. | ................ | 379/196 |
| 6,314,093 B1 | * | 11/2001 | Mann et al. | ................ | 370/351 |

* cited by examiner

Primary Examiner—Jean R. Homere
Assistant Examiner—Leslie Wong
(74) Attorney, Agent, or Firm—Campbell Stephenson Ascolese LLP

(57) ABSTRACT

A method for decomposing a service activation request (SAR) into sub-requests for specific network resources and classifying the SAR with an adaptive bucket value based on the dynamic performance characteristics of the corresponding network resources. Each SAR has a virtual bucket value whose size is determined by the bucket values of its constituent sub-requests. Over time, as multiple SARs are processed, the bucket values associated with each requested resource are adjusted to reflect system resource loading and availability. If the bucket value of a constituent sub-request is adaptively decreased down to a zero value, for instance due to an overflow condition or an excess of requests for that particular service, any new SAR requesting the same resource will be prevented from decomposition and processing. This will happen even if the sub-request is mature, i.e., due to be executed in the very near-term. This mechanism insures optimal utilization of network resources and provides an efficient, automated handling mechanism for processing complex service activation requests.

15 Claims, 2 Drawing Sheets

ADAPTIVE BUCKET INDEXING MECHANISM TO EFFECTIVELY MANAGE SERVICE ACTIVATION REQUESTS

BACKGROUND OF THE INVENTION

1. Field of the Invention

The present invention relates to network management systems and, in particular, to provisioning services across a network or a set of networks.

2. Description of the Related Art

Network operators and network customers request the activation of services by use of simple service orders known as service activation requests (SARs), often provided on paper hardcopy. SARs are processed based upon customer demand and their requested activation date. Customers may demand immediate activation or delayed activation in the short- or long-term, i.e., service requests may have various levels of time criticality. In most situations this is a highly manual and labor- and paper-intensive process.

To add a further dimension to the problem, SARs (including service changes) may also involve complex interactions between many disparate network management systems (NMSs) and Element Management Systems (EMSs) and the elements therein and thus may not be confined to a single network resource under local control. Such a SAR is referred to as a complex SAR, containing many service sub-requests. For instance, a customer may request end-to-end service between two distant cities. Provision of this service may require obtaining dedicated bandwidth on several network resources owned and/or controlled by different parties (NMSs, or EMSs), such as a metropolitan area network in the originating city, a long-haul transport network, and a metropolitan network in the destination city.

Each SAR has its own "due date," i.e., the calendar date and time on which the customer expects the entire service to be provided. All sub-requests share the same SAR due date.

This complexity introduces a level of difficulty in processing SARs with all of the necessary detail to meet customer requirements. As can be seen above, a large-scale (complex) service activation request necessarily includes numerous activation sub-requests addressed to network elements potentially owned by several different parties. Processing such a request currently over-burdens network operators, the network management system or systems where present, and the element management systems. Virtually all of current SARs and their components are handled manually using numerous communication systems, including computer networks and software systems, facsimiles, and the mails.

Prior art systems have attempted to address these shortfalls by a technique known as bulk provisioning. This technique requests multiple services in one large SAR, but is still essentially paper-oriented. While a single SAR contains numerous sub-requests affecting multiple network elements, the decomposition of the SAR is still performed manually, on paper, by human network planners. Bulk provisioning is thus insufficiently fast to keep up with the expanding needs of the modem network.

Automated bulk provisioning (ABP) is also known in the art. Typically, an ABP service activation module (SAM) contains many SARs for the same end-to-end service. For example, an ABP SAM might request "one thousand 25 Mbps virtual private network (VPN) services from San Jose, California to Austin, Texas." Such a SAM thus consists of one thousand VPN SARs; as noted above, each SAR may contain many sub-requests. Current ABP systems, however, often lack robustness and tolerance for resource contention. In the present example, if any one of the sub-requests in any of the 1000 end-to-end VPN SARs cannot be processed, the corresponding SAR will fail. Any sub-request connections already provisioned for the failed SAR must be "rolled back" or de-allocated. The entire ABP SAM may also fail, if the management system that created it so dictates.

ABP systems are also non-scaleable to situations where a large number of different end-to-end services are requested because they lack robust means for managing resource overflow and provisioning errors.

Computer-based provisioning systems, including multi-threaded polling systems, have attempted to address the speed and efficiency problems, but with little success. Multi-threaded polling, in particular, requires too much memory and suffers from performance degradation when faced with complex SARs affecting multiple network elements. Resource shortfalls and the consequent contention issues also cause dead locks in which no SAR or sub-request is able to obtain the contended resource. Prior art automated systems also require complex rollback mechanisms to undo partially-filled complex SARs when a resource contention or error occurs.

What is needed is a method of automatically processing and decomposing complex SARs into service sub-requests appropriate to the required multitude of network resources affected. Furthermore, such a method must be fast, robust, and highly efficient and operable in a wide range of networks of varying complexity.

SUMMARY

Presently disclosed is a method for decomposing a service activation request (SAR) into a series of sub-requests, one per each specific network resource requested, and classifying the SAR with an adaptive bucket value (i.e., classifying it according to a ranking index that can change according to circumstances) based on the dynamic performance characteristics of the corresponding network resources. Each SAR has a virtual bucket value (ranking index) whose size is determined by the bucket values of its constituent sub-requests. Over time, as multiple SARs are processed, the bucket values associated with each sub-request's requested resource are adjusted to reflect system resource loading and availability. If the bucket value of a constituent sub-request is adaptively decreased down to a zero value, for instance due to an overflow condition or an excess of requests for that particular service, any new SAR requesting the same resource will be prevented from decomposition and processing. This will happen even if the sub-request is mature, i.e., due to be executed in the very near-term. This mechanism insures optimal utilization of network resources and provides an efficient, automated handling mechanism for processing complex service activation requests.

The present method also eliminates idling of the service activation request processing system due to resource contention and eliminates the need for complex database locking and/or blocking mechanisms to prevent over-utilization of network resources. Furthermore, the system operates without requiring any polling or absolute measurement of network performance in terms of the network's ability to provision services. Rather, the systems utilizes only the network response time to a request for services to determine its ability to handle further requests. By using a closed loop adaptation system, the present method constantly adjusts its response to each new complex SAR based on the ability of the system to process past SARs.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Service activation requests arrive at the service or business management system (as those terms are understood in the context of the well known telecommunications management network [TMN] model) and are processed and fulfilled (provisioned) by the lower levels of the TMN system. Network operators and administrators currently activate services on customer demand by communicating directly with the affected resource using the NMS and/or the low-level EMS (e.g., by using a graphical user interface or command line interface to configure a router). As currently known, this is a highly manual and paper-intensive process.

The TMN and network management systems in general are further described in H. Wang, *Telecommunications Network Management* McGraw-Hill (1999), incorporated herein by reference in its entirety.

Provisioning, whether through a high-level (multi-element) NMS or simply the access port for a single router or other element, is performed in a completely asynchronous fashion. Customers may request service at any time of any calendar day, and expect complete, end-to-end fulfillment by a customer-supplied due date. Furthermore, SARs may contain sub-requests for service affecting any number of network elements, sub-requests that, themselves, are to be filled asychronously with the end-to-end service of the SAR. In general, each sub-request must be filled before the end-to-end requests (represented by the complex SAR) is filled, but the individual ordering of sub-request fulfillment is not necessarily defined at the time the SAR is initiated.

Figure 1:
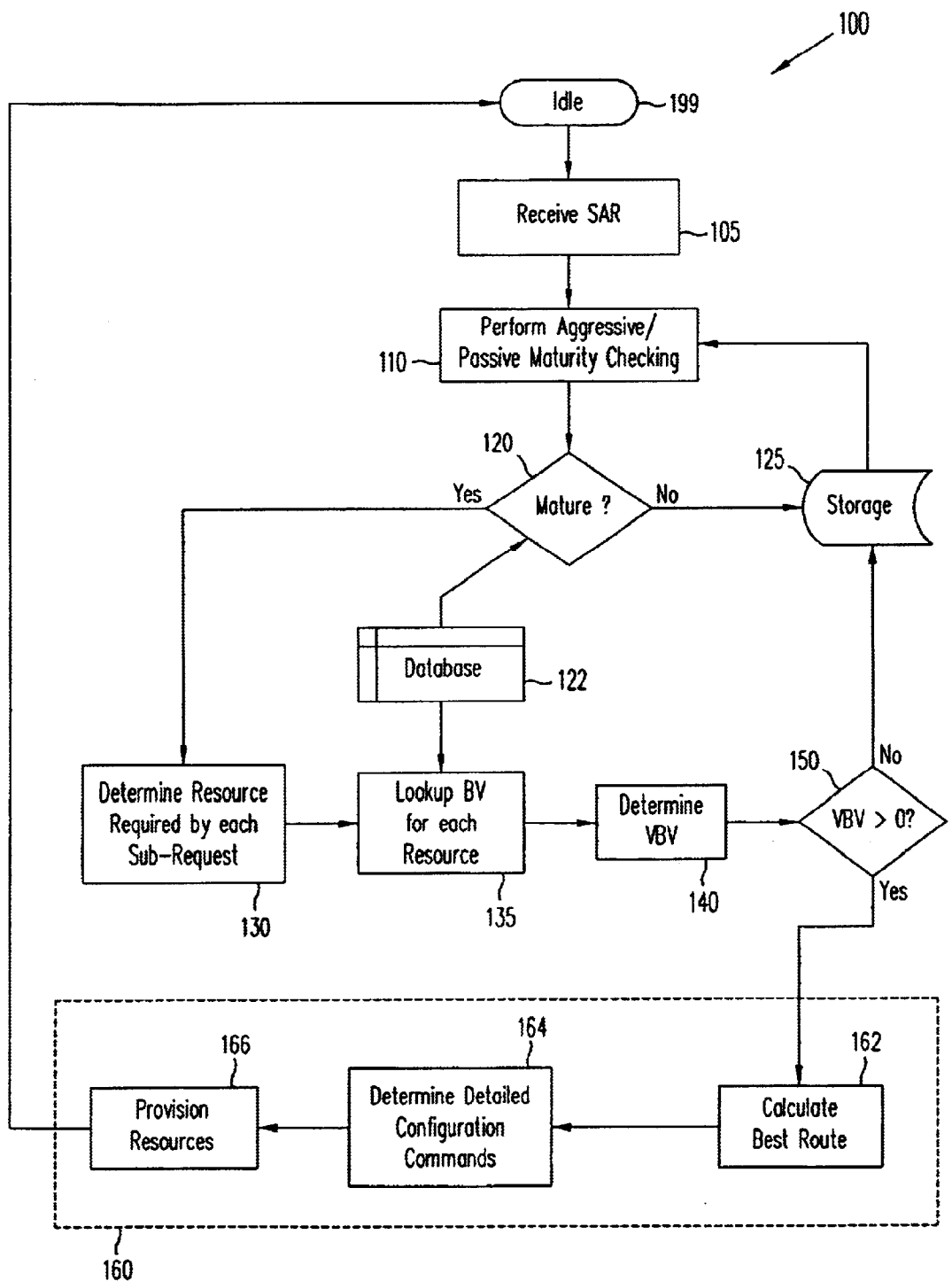
FIG. 1 is a high-level flowchart of the process of one embodiment of the present invention.

Referring to FIG. 1, the process 100 of one embodiment the present invention performs maturity checking 110 on received SAR 105 to determine its overall (end-to-end) due date. This due date, a calendar date and time, is used to calculate a SAR time index, which can be any heuristic or fuzzy logic ranking of timeliness, such as an index from the set {now, soon, later, much later} or a numerical ranking.

Maturity checking 110 comprises both aggressive and passive checking. Aggressive checking means each SAR itself contains a wake-up alarm seed which will wake the SAR when it matures and thus inform the checker 110 that it is due to be processed. Passive checking means a scheduler (or polling) function is provided by checker 110 to manage and monitor the wake-up process. Embodiments of the present invention may contain either or both of these mechanisms. Both are well-known in the art.

If the SAR is found to be mature in test 120, process 100 determines 130 the resources required by the constituent sub-requests of SAR 105. "Mature" status (in test 120) is defined by the following equation.

$$\Delta T_S <= T_P$$

where $$\Delta T_S = T_{DUE\ DATE} - T_{NOW}$$

and $$T_P = T_{PRE\text{-}PROCESSING\ TIME}$$
$$= \max\{T_{SYSTEM\ ROUND\text{-}TRIP\ DELAY} + T_{DECOMPOSE} + T_{ROUTING\text{-}CALCULATION}\}$$

wherein $T_{SYSTEM\ ROUND\text{-}TRIP\ DELAY}$ is the time required by the management system (NMS or EMS, as appropriate) to send a configuration command and receive an acknowledgment from the successfully-configured element. This factor is typically on the order of several seconds. $T_{DECOMPOSE}$ is the time required to actually break a complex SAR down into the actual configuration commands required to provision all constituent sub-requests. This factor is typically on the order of milliseconds. $T_{ROUTING\text{-}CALCULATION}$ is the time needed to calculate the end-to-end route requested in the SAR and determine specific addresses and other parameters necessary to complete the link. This factor is typically on the order of nano- or microseconds. The above factors are set to a pre-defined default value at system initialization and are user adjustable. $T_{SYSTEM\ ROUND\text{-}TRIP\ DELAY}$ is measured and updated throughout the process of some embodiments of the present invention, as will be further discussed below with reference to FIG. 2.

Thus, as part of maturity test 120, process 100 identifies the estimated pre-processing time $T_P$ (i.e., the time required to decompose the SAR into its constituent sub-requests) associated with SAR 105. This identification is accomplished, in one embodiment of the present invention, using initialization database 122. Database 122 contains a list of all possible SAR types for the target network (or network element) and the current estimated time required to decompose ($T_{DECOMPOSE}$) each typical SAR into its constituent sub-requests. Initial values of $T_{ROUTING\text{-}CALCULATION}$ and $T_{SYSTEM\ ROUND\text{-}TRIP\ DELAY}$ are also stored in initialization database 122.

If SAR 105 is not mature, it is placed in storage 125 and is continuously monitored by aggressive/passive checker 110.

Step 130 determines the resource required to provision each sub-request, which is by definition limited to a single resource per sub-request. This determination is accomplished in one embodiment of the present invention by comparing the contents of SAR 105 against a database of network resources (not shown).

Process 100 next determines an initial bucket value (IBV) for each sub-request in step 135. The IBV is also referred to as the initial ranking index. This determining consists, in one embodiment of the present invention, of a simple lookup in initialization database 122 of a default value for each resource set by the operator.

The SAR is assigned a virtual bucket value (VBV) in step 140. The virtual bucket value is determined for the SAR as a whole and is also a ranking index. The virtual bucket value is determined by a simple minimum function of all sub-request bucket values, i.e.:

Virtual Bucket Value=$\min(BV_{SR1}, BV_{SR2}, \ldots BV_{SRn})$ where $BV_{SR1}$ denotes the bucket value of the first sub-request and $BV_{SRn}$ denotes the BV of the last sub-request invoked by SAR 105. Note that for the very first sub-request processed, its BV is set to the BV determined in step 135 by the database lookup. On subsequent invocations of the same sub-request (i.e., when later received SARs request the same resource), step 135 supplies the adaptively-updated bucket value computed by monitoring process 200, described below with reference to FIG. 2.

If the virtual bucket value is greater than zero in test 150, SAR 105 is processed 160. In particular, process 100 calculates 162 the best route across several networks and determines 164 the precise NMS/EMS commands necessary to configure all network elements in the best route as required by each sub-request. Calculation 162 and determination 164 are accomplished by means well-known in the routing arts. The route is automatically provisioned 166 using the detailed commands determined in step 164 by means well-known in the art thus fulfilling the sub-requests of SAR 105. Any provisioning errors are handled and reported by means well-known in the art as well.

If, on the other hand, the VBV is less than or equal to zero, denoting a resource shortfall or other inability to process, then SAR 105 is passed to storage 125 for monitoring by aggressive/passive checker 110 as described above. The system will continue to attempt to provision SAR 105, waiting for resources to become available. In some embodiments of the present invention, this loop will continue indefinitely. In other embodiments, however, a monitoring process, part of aggressive/passive checker 110, senses the lack of resources (i.e., VBV$\leq$0) removes SAR 105 from the queue, and alerts the appropriate management system of its inability to fulfill the SAR.

Figure 2:
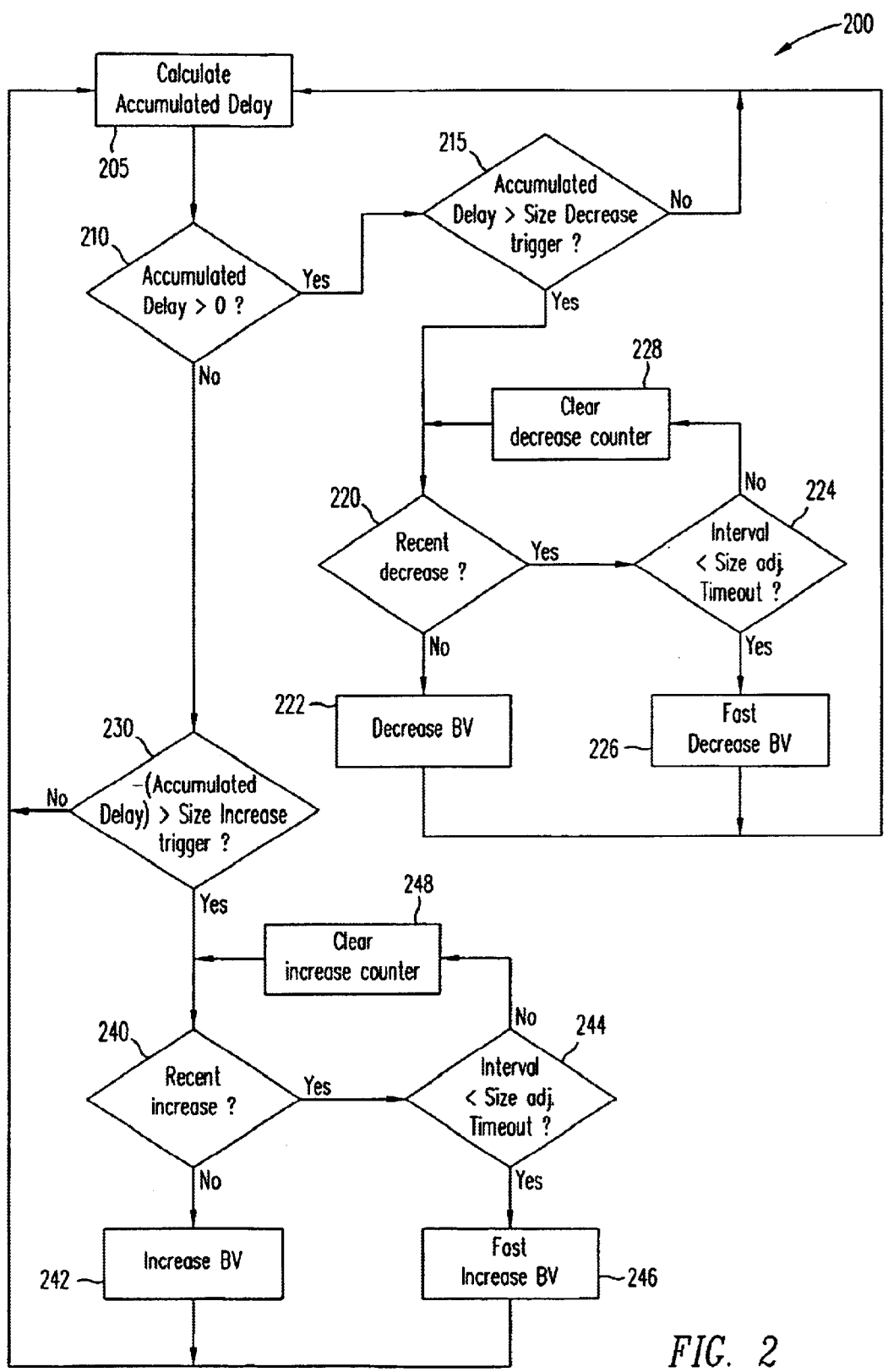
FIG. 2 is a high-level flowchart of the window size adjustment process according to one embodiment of the present invention.

FIG. 2 shows the process of determining and updating the sub-request BVs. Monitoring process 200 operates continuously and in parallel with SAR decomposition process 100 (FIG. 1). Monitoring process 200 begins by calculating the accumulated delay 205 for each requested resource according to the function:

$$\text{Accumulated Delay} = \Sigma (T_{SYSTEM\ ROUND\ TRIP\ DELAY} - \text{delay Threshold})_i$$

Wherein delay Threshold is a pre-determined time threshold used to set the sensitivity of process 200 to variations in $T_{SYSTEM\ ROUND-TRIP\ DELAY}$. The summation is carried out for the i previous configuration commands sent to the resource of interest in step 166 of FIG. 1, where i is a fixed number set by the operator, typically on the order of 5 to 10.

Note that while the actual $T_P$ includes $T_{DECOMPOSE}$ and $T_{ROUTING}$ calculation, the latter two factors are many orders of magnitude less than $T_{SYSTEM\ ROUND-TRIP\ DELAY}$ and can thus be safely ignored.

If the accumulated delay is greater than zero for a resource, the actual delay is tested 215 against a size decrease trigger. The size decrease trigger is a predetermined value above which the resource's BV must be decreased to reflect a high accumulated delay. If test 215 is negative, the process returns to monitoring and calculating the accumulated delay for the next resource, step 205. If test 215 is positive, process 200 checks to see if the BV was recently (i.e., within a small, pre-determined number of monitoring cycles) decreased. If so, then it is possible that that resource has become unavailable or is not operating at full capacity. To ascertain the resource's true condition, the time interval since the last decrease is tested 224 against a pre-determined timeout parameter.

If the interval since the last size adjustment is less than the timeout value, a fast BV decrease 226 will occur. In one embodiment of the present invention, the BV fast decrease is accomplished according to the formula.

$$BV=BV\ (1-\text{fastDecreaseFactor})$$

where fastDecreaseFactor is a percentage value preset by the operator. This fastDecreaseFactor drives the BV toward zero, thus signifying the impossibility of provisioning the resource to the SAR.

On the other hand, if the outcome of test 224 is negative (signifying a decrease interval greater than the size adjust timeout value), the decrease counter is cleared and the process returns to test 220. Now, because the counter is cleared, test 220 fails and the BV is decreased by a normal decrease amount. In one embodiment, the normal size decrease is performed according to the following formula:

$$BV=BV\ (1-\text{sizeDecreaseFactor})$$

where, as above, sizeDecreaseFactor is a percentage value preset by the operator. The sizeDecreaseFactor is, of course, less than fastDecreaseFactor.

In either the normal or the fast BV decrease case, process 200 returns to calculating the accumulated delay for the next requested resource at step 205.

If the outcome of test 210 is negative, i.e., the accumulated delay is less than or equal to zero, the negative of the accumulated delay value (e.g., its absolute value) is compared to a size increase trigger. If the accumulated delay has fallen enough to enable an increase in the BV, steps 240, 242, 244, 246, and 248 accomplish either a regular or a fast BV increase. As can be seen from FIG. 2, these latter steps operate analogously to the BV decrease logic discussed above. Similarly, in some embodiments steps 242 and 246 use similar equation as steps 222 and 226, respectively, except that the increase logic uses factors sizeIncreaseFactor and fastIncreaseFactor instead of sizeDecreaseFactor and fastDecreaseFactor.

The following table shows representative values of the system threshold, trigger, and other parameters used in one embodiment of the present invention.

| | |
|---|---|
| delayThreshold | 3000 ms |
| sizeIncreaseTrigger | 8000 ms |
| sizeDecreaseTrigger | 8000 ms |
| sizeAdjustTimeout | 30,000 ms |
| fastDecreaseFactor | 40% |
| sizeDecreaseFactor | 20% |
| fastIncreaseFactor | 30% |
| sizeIncreaseFactor | 15% |

The order in which the steps of FIGS. 1 and 2 are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may be in the form of computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described it will be apparent to those skilled in the art that changes and modifications may be made without departing from this invention in its broader aspect and, therefore, the appended claims are to encompass within their scope all such changes and modification as fall within the true spirit of this invention.

We claim:

1. A method of processing a service activation request (SAR) comprising:

analyzing a SAR comprised of a plurality of sub-requests and a SAR due date, each said sub-request having an accumulated delay time;

determining a ranking index for each said sub-request; and assigning to said SAR a virtual ranking index equal to the least of said ranking indices;

wherein said SAR is processed according to said due date.

2. The method of claim 1, wherein said determining comprises adaptively computing said ranking index based on said accumulated delay time.

3. The method of claim 2 wherein said adaptively computing further comprises:

changing said ranking index by a large increment if said ranking index has been recently changed;

changing said ranking index by a small increment if said ranking index has not been recently changed; and leaving said ranking index unchanged if said accumulated delay time is less than a threshold value.

4. A computer system for processing a service activation request (SAR), comprising computer instructions for:

analyzing a SAR comprised of a plurality of sub-requests and a SAR due date, each said sub-request having an accumulated delay time;

determining a ranking index for each said sub-request; and assigning to said SAR a virtual ranking index equal to the least of said ranking indices;

wherein said SAR is processed according to said due date.

5. The computer system of claim 4, wherein said determining comprises adaptively computing said ranking index based on said accumulated delay time.

6. The computer system of claim 5 wherein said adaptively computing further comprises:

changing said ranking index by a large increment if said ranking index has been recently changed;

changing said ranking index by a small increment if said ranking index has not been recently changed; and leaving said ranking index unchanged if said accumulated delay time is less than a threshold value.

7. A computer-readable storage medium, comprising computer instructions for:

analyzing a SAR comprised of a plurality of sub-requests and a SAR due date, each said sub-request having an accumulated delay time;

determining a ranking index for each said sub-request; and assigning to said SAR a virtual ranking index equal to the least of said ranking indices;

wherein said SAR is processed according to said due date.

8. The computer-readable storage medium of claim 7, wherein said determining comprises adaptively computing said ranking index based on said accumulated delay time.

9. The computer-readable storage medium of claim 8, wherein said adaptively computing further comprises:

changing said ranking index by a large increment if said ranking index has been recently changed;

changing said ranking index by a small increment if said ranking index has not been recently changed; and leaving said ranking index unchanged if said accumulated delay time is less than a threshold value.

10. A computer data signal embodied in a carrier wave, comprising computer instructions for:

analyzing a SAR comprised of a plurality of sub-requests and a SAR due date, each said sub-request having an accumulated delay time;

determining a ranking index for each said sub-request; and assigning to said SAR a virtual ranking index equal to the least of said ranking indices;

wherein said SAR is processed according to said due date.

11. The computer data signal of claim 10, wherein said determining comprises adaptively computing said ranking index based on said accumulated delay time.

12. The computer data signal of claim 11, wherein said adaptively computing further comprises:

changing said ranking index by a large increment if said ranking index has been recently changed;

changing said ranking index by a small increment if said ranking index has not been recently changed; and leaving said ranking index unchanged if said accumulated delay time is less than a threshold value.

13. A system for processing a service activation request (SAR) comprising:

means for analyzing a SAR comprised of a plurality of sub-requests and a SAR due date, each said sub-request having an accumulated delay time;

means for determining a ranking index for each said sub-request; and means for assigning to said SAR a virtual ranking index equal to the least of said ranking indices; wherein said SAR is processed according to said due date.

14. The system of claim 13, wherein said determining comprises adaptively computing said ranking index based on said accumulated delay time.

15. The system of claim 14, further comprising:

means for changing said ranking index by a large increment if said ranking index has been recently changed;

means for changing said ranking index by a small increment if said ranking index has not been recently changed; and means for leaving said ranking index unchanged if said accumulated delay time is less than a threshold value.

* * * * *